Figure 1:
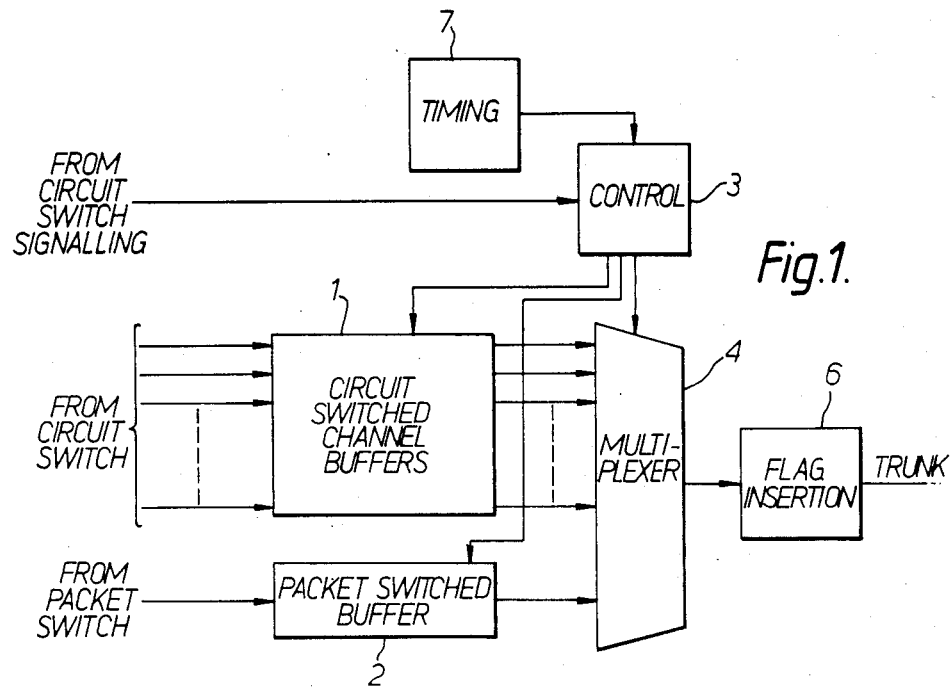

United States Patent [19]

Lewis

[11] Patent Number: 4,663,755
[45] Date of Patent: May 5, 1987

[54] TRANSMISSION SYSTEM

[75] Inventor: John F. Lewis, Bishops Stortford, England

[73] Assignee: STC plc, London, England

[21] Appl. No.: 757,355

[22] Filed: Jul. 22, 1985

[30] Foreign Application Priority Data

Aug. 1, 1984 [GB] United Kingdom ................ 8419605

[51] Int. Cl.$^4$ ................................................ H04J 6/00
[52] U.S. Cl. ..................................................... 370/60
[58] Field of Search ......................... 370/60, 94, 110.1

[56] References Cited

U.S. PATENT DOCUMENTS

| | | | |
|---|---|---|---|
| 4,251,880 | 2/1981 | Baugh et al. | 370/89 |
| 4,413,337 | 11/1983 | Dauphin et al. | 370/110.1 |
| 4,476,559 | 10/1984 | Brolin et al. | 370/110.1 |
| 4,494,231 | 1/1985 | Slawy et al. | 370/60 |
| 4,556,972 | 12/1985 | Chan et al. | 370/60 |
| 4,575,844 | 3/1986 | Kosuge et al. | 370/60 |
| 4,592,048 | 5/1986 | Beckner et al. | 370/60 |

FOREIGN PATENT DOCUMENTS

| | | |
|---|---|---|
| 1021927 | 3/1966 | United Kingdom . |
| 1043447 | 9/1966 | United Kingdom . |
| 1186385 | 4/1970 | United Kingdom . |
| 1463002 | 2/1977 | United Kingdom . |
| 1486105 | 9/1977 | United Kingdom . |

Primary Examiner—Douglas W. Olms
Assistant Examiner—Kenneth I. Rokoff
Attorney, Agent, or Firm—Kerkam, Stowell, Kondracki & Clarke

[57] ABSTRACT

In an information transmission system for use for internode trunks, both circuit-switched and packet-switched traffic is handled, the former being given priority. The system uses successive equal-length envelopes each providing a number of bits usable to provide a number of frames each usable for either sort of traffic. Circuit-switched traffic has priority and uses frames at the beginnings of the envelopes, after which packets are handled. The envelope is of such a size that it provides frames for all circuit-switched channels to be catered for, and in most cases the remainder of the envelope can handle packet traffic.

4 Claims, 2 Drawing Figures

TRANSMISSION SYSTEM

BACKGROUND OF THE INVENTION

This invention relates to information transmission systems of the type in which the transmission capacity between nodes of a trunk network is shared between circuit-switched and packet-switched traffic.

British patent specification No. 892399 (STC) is one of the pioneer disclosures of methods of combining two different sorts of traffic over the same communications path. It discloses a TDM-PCM system in which the TDM channels are usable for high priority (e.g. speech) intelligence or low priority (e.g. data) intelligence. When a silent period in the high priority intelligence occurs, low priority intelligence is sent. This increases the amount of traffic which can be handled by the communications path.

A more recent extension of the general principle of increasing the amount of traffic to be handled is described in British patent specification No. 1486105 (IBM). This is a TDM system in which circuit-switched traffic has first option on the system's time slots, but store and forward traffic is sent in gaps in the circuit-switched traffic. This further improves traffic handling capacity of such a system.

Other Patent Specifications of interest in the present context are British patent specifications Nos. 1005075, 1021927, 1043447, and 1186385, and European application Ser. No. 0082333A1.

SUMMARY OF THE INVENTION

This invention seeks to improve still further the traffic-handling capacity of a system in which both circuit-switched and packet-switched intelligence have to be handled.

In a system embodying the invention digital data is conveyed in a number of successively-occurring fixed-duration envelopes each providing the capacity for a number of successive bity frames. Each such envelope embraces a number of bits greater than that needed to handle the maximum number of simultaneous circuit-switched connections to be provided for, priority being given to circuit-switched traffic which is conveyed in bit frames at the commencement of each of the envelopes. The capacity not needed to handle circuit-switched traffic is then available to handle packet-switched traffic.

Such an arrangement extends the principles hinted at in the prior art to a great extent.

Figure 2:
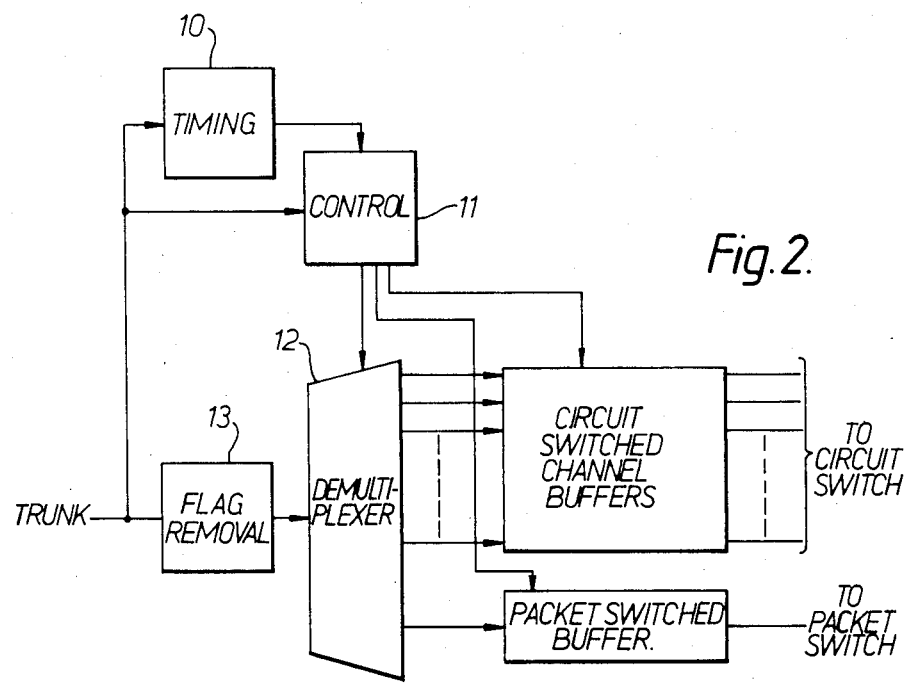

An embodiment of the invention will now be described with reference to the accompanying drawing, in which FIG. 1 is a block diagram of a transmitter for a system embodying the invention, while FIG. 2 is a block diagram of a receiver for such a system.

PRINCIPLES OF OPERATION

The digital data is conveyed over the transmission medium in a number of successively-occurring constant-duration envelopes, each embraces a number of bits which can be used to provide a number of bit frames. Each of these bit frames initially provides, in the present system, for the same number of intelligence bits. As will be seen later, these bit frames may have different lengths when sent on the medium or bearer. During such an envelope, frames are assembled from circuit-switched channels. At the beginning of a time envelope, frames containing bits from active ones of those channels assembled during the previous envelope time are transmitted on the medium or bearer. The length of these frames depends on the circuit-switched channel bit rate. Surplus capacity at the end of the envelope is used to transmit intelligence frames from a packet-switched source. Such surplus capacity is available since the medium or bearer capacity is greater than that needed to service the circuit-switched source, and is available temporarily to a greater extent if one or more circuit-switched channels is not in use.

The frames are separated by flag bytes, each of which is 01111110. To avoid the bit stream incorrectly simulating flag, a zero bit is inserted after a set of five 1 bits, the bearer capacity providing for the need to insert such zero bits.

Transmission of information for all of the circuit-switched channels served by the medium is guaranteed by using a bearer whose bit rate is greater than the aggregate bit rate of the circuit-switched channels, due allowance being made for the frame overhead. The term "frame overhead" refers to the "non-information" bits needed for each frame, these including addresses for the frame, inter-frame bits such as the multi-bit flags used to identify the start of a frame, zero bits inserted to prevent flag simulation etc. The number of bits needed to cater for zero bit insertion is determined on a statistical basis, to provide for what is expected to be the worst condition. Hence in most cases some of the bits provided for the purpose will not be used, and may be available for packet traffic.

Thus it will be seen that the system provides a variable bit rate multiplexer for circuit-switched channels (although the bit rate for an active channel is fixed while that channel is active), and an adaptive method of sharing bearer capacity between circuit and packet-switched services.

The fixed-duration envelopes used each commence with a number of frames allocated to circuit-switched channels, this number being determined by the amount of such channels to be served by the bearer. These frames are followed by one or more further frames allocated to packet-switched transmission. They are followed by filler characters used to fill the envelope to its fixed capacity. Note that where the circuit-switched traffic is less than the intended maximum, in which case one or more such channels is inactive, any such inactive channel is available for use for packet-switched transmission. The frames are separated from each other by special flag characters, and are identified by address (and possibly other) characters at the head of each frame.

Information from the circuit-switched channels is carried in the early part of the envelope, and has priority over the packet-switched intelligence where the real-time element is less important.

Each frame has an opening flag 01111110, an identifier field, an information field and a closing flag. The closing flag of one frame can be used as the opening flag of the next frame. Note that the flag character used is that used in HDLC/X25. The identifier flag includes one byte the first bit of which indicates the traffic type of its frame, 1 for packet and 0 for circuit-switched. If the frame is for circuit-switched traffic the next seven bits of the byte denote the number of the trunk channel allocated to the call. For packet-switched frames the use of these bits is undefined.

A zero-bit insertion function is provided as already mentioned to ensure that the information and identifier fields cannot simulate flags. This involves inserting a 0 bit after any group of five successive 1 bits, which prevents such simulation since a flag includes six successive flag bits. A complementary function at a receiving termination is provided to remove any such inserted bits.

No error checking is performed, none being needed for the circuit-switched traffic, and in the present system none is provided for the packet service. This method is satisfactory for trunk bearers having an error rate of the order of 1/10,000 or better. However, where error rates are higher, additional measures are needed to achieve adequate throughput of the packetised information and to deal with problems due to flag simulation.

The Transmitter (FIG. 1)

This includes a number of circuit-switched buffers in a block 1 which are fed from an associated circuit switch (not shown), and which use shift-register like storage. These buffers hold accumulated channel information until the appropriate channels gain access to the bearer. Hence each such buffer has enough capacity to hold the number of bits which the channel can generate during one envelope time. There is also a packet-switched buffer 2, fed from an associated packet switch (not shown), which has a capacity to hold the number of packets determined by the system acknowledgement window.

The buffers 1, 2, when active, are loaded continuously at the channel rates of their source switches, and are accessed at the bearer rate under control of the control unit 3. Each buffer when accessed passes its contents, or in the case of the packet buffer 2 as much as can be handled in the residue of the envelope, to the transmission medium (trunk) via a multiplexer 4. The multiplexer also functions under control of the control unit 3.

The multiplexer output goes via a flag insertion unit 6, which monitors the bit stream, and inserts 0 bits after each block of five consecutive 1 bits, to prevent flag simulation. Downstream of this operation it also inserts the flags, each at the appropriate position to delimit the frames.

The control unit 3 receives envelope start and bit timing from a timing unit (clock pulse source) 7, and the identities of the currently active circuit-switched channels from the circuit-switched source. Acting on this information, the control unit 3 routes the contents of the active circuit-switched buffers 1 to the multiplexer 4 in numerical order, followed by intelligence from the packet-switched buffer 2. The proportion of the envelope duration available to the packet buffer 2 depends, as already indicated, on how many circuit-switched channels are active.

When the next envelope start occurs, which follows the filler characters after the packet frames, the control unit 3 once again routes the contents of the circuit-switched channels to the bearer.

The timing unit 7, which generates the clock pulses needed for the transmitter, can be self-generating, or can be controlled from the clock of the associated circuit-switched exchange.

Receiver (FIG. 2)

This includes a number of units which are similar to those of the transmitter but functioning, in effect, in reverse thereto. Thus the incoming trunk is applied to a timing unit 10, which extracts the bit timing from the bearer bit stream and passes it on to the control unit 11. No other timing is needed, since the control unit 11 directly extracts frame synchronisation from the delimiter flags which separate the frames. When the control unit 11 finds a flag, it uses the next byte to determine switching of the demultiplexer 12 for the subsequent information field.

The bit stream is also monitored by the flag removal unit 13, which removes the flags and the "anti-simulation" 0 bits before they reach the demultiplexer. The contents of the information fields are routed from the demultiplexer 12 into the appropriate buffers 14 and 15 and therefrom to the circuit switch and the packet switch.

I claim:

1. An information transmission system, in which digital data is conveyed in successively-occuring fixed-duration envelopes each of which provides capacity for a number of successive equal-duration bit frames, in which:
   (a) the system has first input means over which circuit-switched traffic is received by the system and second input means over which packet-switched traffic is received by the system, circuit-switched traffic being routed into first buffer storage means and packet-switched traffic being routed into second buffer-storage means;
   (b) a timing means for the system allots bit frames at the commencement of each said envelope for a present maximum number of circuit-switched communications, the remainder of that envelope being available, under the control of said timing means, for conveying packet-switched traffic, the arrangement being such that priority is given to circuit-switched traffic;
   (c) the duration of said envelope is such that a said envelope has a capacity greater than that needed to accommodate the maximum number of simultaneously-existing circuit-switched communications to be catered for;
   (d) a monitoring means under the control of the timing means monitors traffic incoming to the system over said first input means to determine how much circuit-switched traffic has to be handled;
   (e) a means under control of said monitoring means allocates capacity which is not needed for circuit-switched traffic to packet-switched traffic; and
   (f) a multiplex means under control of said monitoring means sends circuit-switched traffic from said first storage means to the system output using bit frames at the commencement of the envelope, whereafter during the remainder of the bit capacity of the envelope packet-switched traffic which is awaiting transmission is routed from the second buffer storage means to the system output.

2. A system as claimed in claim 1, in which the frames are separated one from the other by flags each of which includes a block of x consecutive 1 bits, and in which to prevent flag simulation any group of (x−1) 1 bits has a 0 bit inserted thereafter.

3. A system as claimed in claim 1, and which includes monitoring means which monitors the bit stream which leaves the multiplexer, first insertion means under control of the monitoring means and arranged to insert flag bytes into the bit stream to separate said frames one from the other, each said flag byte being formed by the bit combination 01111110, and second insertion means also under control of the monitoring means and arranged to insert a zero bit after any occurrence of five successive 1 bits in the intelligence bit stream, thus ensuring that the bit stream is unable to incorrectly simulate a flag byte.

4. A receiver for a system as claimed in claim 3, and which includes monitoring means which monitors the incoming bit stream from a remote transmitter, removal means under the control of said monitoring means and adapted to remove both the flag bytes and the inserted zero bits from said bit stream, a demultiplexer to which the bit stream outputted from the monitoring means is applied, a set of circuit-switched buffers and a packet-switched buffer, and control means which routes the intelligence via the demultiplexer to the appropriate one of said buffers.

* * * * *